United States Patent [19]

Ichikawa

[11] 4,371,218

[45] Feb. 1, 1983

[54] BEARING MECHANISM

[75] Inventor: Michihiro Ichikawa, Kiryu, Japan

[73] Assignee: Ichikawa Iron Works Co., Ltd., Kiryu, Japan

[21] Appl. No.: 220,983

[22] Filed: Dec. 29, 1980

[30] Foreign Application Priority Data

Dec. 26, 1979 [JP] Japan .............................. 54-180860

[51] Int. Cl.³ ........................................... F16C 39/06
[52] U.S. Cl. ..................................... 308/10; 308/228
[58] Field of Search .............. 308/10, 228, 156, 207 R

[56] References Cited

U.S. PATENT DOCUMENTS

| | | | |
|---|---|---|---|
| 2,351,951 | 6/1944 | Gleitz | 308/228 |
| 2,671,702 | 3/1954 | Meadows | 308/156 |
| 2,798,775 | 7/1957 | Bell | 308/228 |
| 3,209,152 | 9/1965 | Brouwer | 308/10 |
| 4,080,012 | 3/1978 | Boden | 308/10 |
| 4,091,687 | 5/1978 | Meinke | 308/10 |
| 4,249,784 | 2/1981 | Ichikawa | 308/207 R |

FOREIGN PATENT DOCUMENTS 1236411  6/1971  United Kingdom ................. 308/10

Primary Examiner—R. Skudy
Attorney, Agent, or Firm—Armstrong, Nikaido, Marmelstein & Kubovcik

[57] ABSTRACT

A bearing mechanism for supporting a spindle or a shaft to be driven for rotation at super-high speeds, comprising at least one journal bearing assembly engaging a journal portion of the spindle or the shaft, and a non-contact magnetic thrust bearing unit which is magnetically linked with an axial end portion of the spindle or the shaft for thereby carrying the axial load of the spindle or the shaft by the magnetic interaction between the bearing unit and the end portion of the spindle or the shaft.

14 Claims, 4 Drawing Figures

BEARING MECHANISM

FIELD OF THE INVENTION

The present invention relates to a bearing mechanism for supporting an elongated rotary member such as a shaft, spindle or the like which is to be driven for rotation about the axis thereof at a superhigh speed of, for example, more than 30,000 revolutions per minute.

BACKGROUND OF THE INVENTION

In some kinds of rotary machines, the shafts or spindles to carry the rotational motions are driven to rotate at superhigh speeds which reach 30,000 to 50,000 revolutions per minute in the case of some textile production equipment such as for example roving frames, spinning frames and throwing machines. Such a superhigh speed rotation of a shaft or spindle imposes various exacting requirements on the bearing mechanism to be used to support the shaft or spindle. One of these requirements is to cope with the wear and abrasion of the members and elements of the bearing mechanism which are subject to sliding and rolling frictions concomitant with the superhigh speed rotation of the shaft or spindle supported by the bearing mechanism.

A known bearing mechanism which has been used for supporting the spindle of a textile production equipment such as typically a yarn wrapping machine uses a journal bearing assembly which is largely made up of an ordinary ball bearing consisting of inner and outer race members and spherical bearing elements interposed between the inner and outer race members. The shaft or spindle to be supported by such a bearing assembly is directly contacted by the inner race member of the ball bearing is driven to rotate at a speed equal to the speed of rotation of the shaft or spindle supported by the journal bearing assembly and, for this reason, the maximum speed of rotation allowable of the shaft or spindle is limited by the wear and abrasion resistance of the ball bearing.

In the field of machine engineering, it is known that ball bearings in general tend to be critically worn out to such an extent as to be no longer serviceable when subjected to continuous rotation at speeds exceeding about 15,000 revolutions per minute. With the rotational mechanism in which the shaft or spindle is contacted by the inner race member of a ball bearing, therefore, the shaft or spindle must be driven for rotation at a speed lower than 15,000 revolutions per minute. This has brought forth a bar to increasing the performance efficiency or achieving the desired performance efficiency of, for example, a yarn wrapping machine.

To break through such a bar, a journal bearing assembly has been proposed, which is capable of withstanding the rotation at speeds higher than 30,000 revolutions per minute and maintaining a shaft, spindle or the like in a stable condition for an extended period of time.

A representative example of such a journal bearing assembly is shown in U.S. patent application Ser. No. 071,232. One of the outstanding features of the journal bearing assembly therein shown is the arrangement in which the revolution speed of the shaft or spindle supported by the bearing assembly is transmitted, upon reduction, to the rotary member of a bearing forming part of the bearing assembly so that the shaft or spindle can be driven to rotate at a speed higher in a desired ratio than the upper limit of the acceptable range of the revolution speed of the bearing assembly. The prior-art journal bearing assembly is constructed and arranged in such a manner that the loads imparted to the bearing assembly in radial directions from the shaft or spindle supported by the bearing assembly are cancelled by one another so that the shaft or spindle is maintained in a correct position with respect to the bearing assembly and is prevented from being caused to sway or laterally oscillate during superhigh speed rotation of the shaft or spindle. The prior-art bearing assembly is further constructed and arranged so that the impacts and vibrations which may be transferred to the bearing assembly from the shaft or spindle supported by the bearing assembly can be efficiently dampened out so that the shaft or spindle is enabled to rotate smoothly and noiselessly in the bearing assembly.

More particularly, the journal bearing assembly taught in U.S. patent application Ser. No. 071,232 comprises a casing, a bearing holder formed with a cavity therein and closely fitted in the casing and at least three bearing units retained in position in the cavity of the bearing holder and arranged in symmetry about the center axis of the cavity. Each of the bearing units comprises a rotatable member freely rotatable in the cavity about an axis parallel with the center axis of the cavity, an inner race member rotatable with the rotatable member, an outer race member fast on the bearing holder, and bearing elements rollably disposed between the inner and outer race members and wherein the shaft or spindle to be supported by the bearing assembly is in rollable contact with the respective rotatable members of the individual bearing units. If, therefore, the respective rotatable members of the individual bearing units are sized with respect to the spindle or a journal portion of the spindle in such a manner that the diameter of each of the rotatable members is a certain number of times larger than the journal portion of the spindle, each of the inner race members mounted on the rotatable member is to be driven for rotation with a number of turns per unit time which is smaller by the particular number of times than the number of turns of the spindle. If, for example, the spindle or the journal portion of the spindle has the diameter of 12 mm and the rotatable member of each of the bearing units has the diameter of 36 mm which is thrice larger than the diameter of the former and if the spindle is driven to make 40,000 turns per minute, each of the inner race members of each bearing unit will make about 13,333 turns per minute which is approximately equal to one third of the number of turns of the spindle. Such a revolution speed of the inner race members with respect to the stationary outer race members is within the range acceptable for bearings in general and will therefore assure the guaranteed performance quality and service life of the bearing unit.

To exploit these outstanding features and advantages of the prior-art journal bearing assembly, it is of critical importance that such a journal bearing assembly be used in combination with a thrust bearing unit which is competent in performance with the journal bearing assembly. A known thrust bearing unit using rolling elements of the ball or roller type is not capable of reliably carrying the axial load of the spindle or shaft supported by the prior-art journal bearing assembly of the described nature.

It is, accordingly, an object of the present invention to provide a bearing mechanism which includes a thrust bearing unit which is compatible in use with a journal bearing assembly withstanding the super-high rotation of a spindle or shaft to be driven for rotation at speeds of the order of tens of thousands of revolutions per minute.

SUMMARY OF THE INVENTION

In accordance with the present invention, such an object will be accomplished in a bearing mechanism for supporting an elongated rotary member such as a spindle or a shaft having a center axis therethrough and rotatable about the center, the rotary member having at least one journal portion and at least one axial end portion, comprising a stationary support structure, at least one journal bearing assembly supported on the stationary support structure and engaging the journal portion of the rotary member for being operative to carry radial load from said rotary member, and a non-contact, magnetic thrust bearing unit which is stationary with respect to the support structure and which is positioned adjacent the axial end portion of the rotary member, the thrust bearing unit comprising a cylindrical member having an axial bore therein and positioned in substantially coaxially encircling relationship to the axial end portion of the rotary member, at least one of the cylindrical member and the end portion of the rotary member being constructed of a magnet.

In the bearing mechanism thus constructed and arranged basically, it may be the aforesaid cylindrical member which is constituted by the permanent magnet, the magnet member having opposite magnetic poles at the opposite axial ends of the cylindrical member. In this instance, the thrust bearing unit of the bearing mechanism according to the present invention may further comprise two annular pole pieces which are respectively attached to the opposite axial end faces of the cylindrical magnet member and which are positioned in substantially coaxially encircling relationship to the aforesaid axial end portion of the above mentioned elongated rotary member. Each of these pole pieces may have such inside and outside diameters that are smaller than the inside and outside diameters, respectively, of the cylindrical magnet member.

On the other hand, the journal bearing assembly forming part of the bearing mechanism according to the present invention may comprise a hollow casing connected to the above mentioned support structure, a bearing holder closely and detachably fitted in the casing and formed with a cavity having a center axis therethrough and including a central portion and at least three generally semicylindrical groove portions merging radially outwardly from the central portion, and bearing units positioned each in part in these cylindrical groove portions, respectively, and substantially semicylindrically protruding each in part into the central portion of the cavity, each of the bearing units comprising a rotatable member having a circular cross section and rotatable in part through each of the semicylindrical groove portions about an axis substantially parallel with the center axis of the cavity, and at least one bearing comprising an inner race member positioned on one side of the rotatable member and rotatable with the rotatable member, an outer race member radially spaced apart from the inner race member and closely and detachably fitted to the bearing holder, and a plurality of rolling elements rollably disposed between the inner and outer race members, the respective rotatable members of the individual bearing units being larger in diameter than the respective outer race members in the individual bearing units and forming therebetween an open space for passing the journal portion of the aforesaid elongated rotary member therethrough so that the journal portion of the rotary member is in rollable contact with the peripheral surfaces of the respective rotatable members of the bearing units and is retained in a position having its center axis substantially in alignment with the center axis of the aforesaid cavity.

BRIEF DESCRIPTION OF THE DRAWINGS

The features and advantages of the bearing mechanism according to the present invention will be more clearly appreciated from the following detailed description taken in conjunction with the accompanying drawings, in which.

DESCRIPTION OF THE PREFERRED EMBODIMENT

Figure 1:
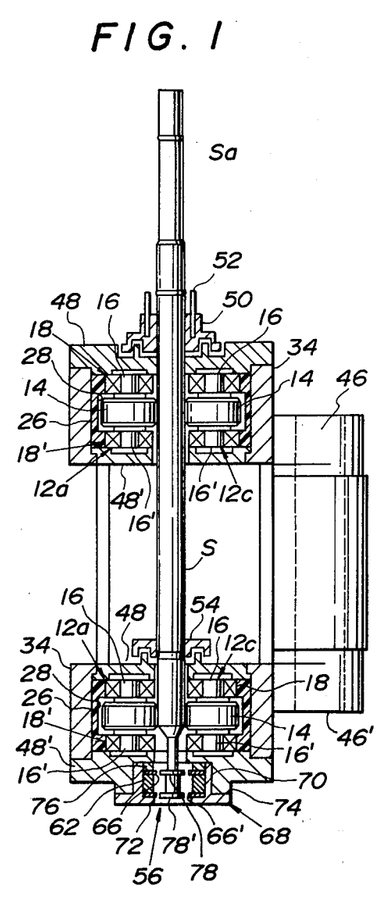
FIG. 1 is a vertical sectional view which shows a preferred embodiment of the bearing mechanism according to the present invention.

Referring to FIG. 1 of the drawings, a bearing mechanism embodying the present invention is shown in combination with a rotary spindle S. The spindle S may form part of, for example, a textile machine such as a textile yarn wrapping machine used for wrapping or covering a wadding or core yarn with a spun yarn or filament as is well known in the art.

The rotary spindle S is shown as extending vertically and has upper and lower axial extensions Sa and Sb. The spindle S further has an upper journal portion adjacent to the upper axial extension Sa and a lower journal portion adjacent to the lower axial extension Sb.

The bearing mechanism embodying the present invention is assumed to be used for supporting such a rotary spindle S and is shown comprising, by way of example, two bearing assemblies which consist of an upper journal bearing assembly 10a engaging the above mentioned upper journal portion of the spindle S and a lower journal bearing assembly 10b engaging the above mentioned lower journal portion of the spindle S.

The upper and lower journal bearing assemblies 10a and 10b are constructed similarly to each other and, thus, all the corresponding units, members, elements and portions of the two bearing assemblies are designated by like reference numerals and characters.

Figure 2:
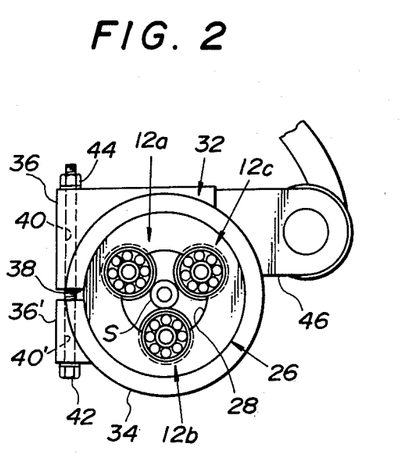
FIG. 2 is an upper end view of the bearing mechanism illustrated in FIG. 1.
Figure 3:
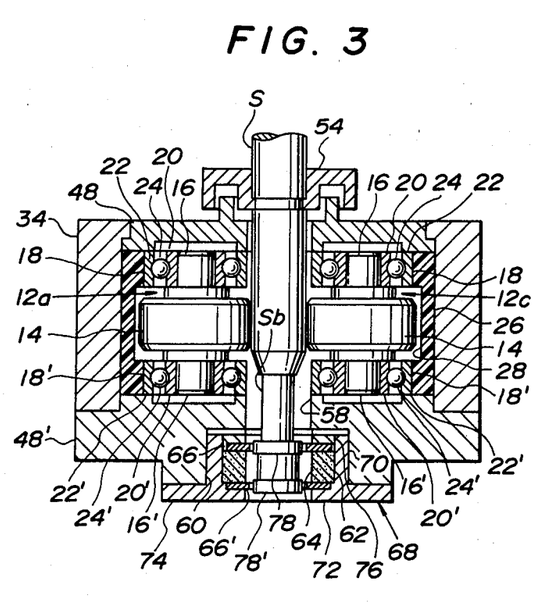
FIG. 3 is a vertical sectional view which shows, to an enlarged scale, the magnetic thrust bearing unit and the associated one of the journal bearing assemblies which form part of the bearing mechanism illustrated in FIGS. 1 and 2.

Referring to FIGS. 2 and 3 as well as FIG. 1 of the drawings, each of the upper and lower journal bearing assemblies 10a and 10b comprises three or more bearing units which are, in the embodiment herein shown, assumed to consist of three bearing units 12a, 12b and 12c by way of example as shown in FIG. 2. The individual bearing units 12a, 12b and 12c thus forming part of each of the bearing assemblies 10a and 10b are constructed and dimensioned similarly to one another and, for this reason, all the corresponding members and elements of the three bearing units are also designated by like reference numerals.

Thus, each of the bearing units 12a, 12b and 12c is shown comprising a cylindrical or disc-shaped rotatable member 14 having a circular cross section and rotatable about its center axis with a pair of shafts 16 and 16' axially projecting in the opposite directions from both sides of the rotatable member 14. The shafts 16 and 16' have respective center axes aligned with the center axis of the rotatable member 14 and may be either individually secured to the rotatable member 14 or constructed as portions of a unitary shaft which is securely passed through the rotatable member 14 in the axial direction of the rotatable member. The shafts 16 and 16' projecting from the rotatable member 14 have mounted thereon ball bearings 18 and 18', respectively. As shown in FIG. 3, the ball bearing 18 on the shaft 14 consists of an inner race member 20 secured to and rotatable with the shaft 14, an outer race member 22 radially outwardly spaced apart from from the inner race member 20, and a plurality of spherical rolling elements 24 rotatably and slidably disposed between the inner and outer race members 20 and 22. Likewise, the ball bearing 18' on the shaft 16' consists of an inner race member 20' secured to and rotatable with the shaft 14', an outer race member 22' radially outwardly spaced apart from the inner race member 20', and a plurality of spherical rolling elements 24' rotatable and slidably disposed between the inner and outer race members 20' and 22'. The rotatable member 14 and each of the respective outer race members 22 and 22' of the ball bearings 18 and 18' are, thus, rotatable relative to each other about the aligned center axes of the rotatable member 14 and each of the shafts 16 and 16'. The outer race members 22 and 22' of the two ball bearings 18 and 18', respectively, have substantially equal outside diameters which are smaller than the outside diameter of the rotatable member 14. It will be apparent that each of the ball bearings 18 and 18' may be substituted, if desired, by a roller bearing using cylindrical or tapered rolling elements in lieu of the spherical rolling elements 24 or 24' of the ball bearing 18 or 18' shown.

The bearing units 12a, 12b and 12c each constructed as above described are assembled together in a bearing holder 26 which consists of a unitary block constructed of an elastic material and having a center axis therethrough and flat opposite end faces perpendicular to the center axis of the block. The bearing holder 26 has a cylindrical outer peripheral surface and substantially flat end faces and is formed with a cavity 28 which is open at the opposite axial ends of the bearing holder 26. The cavity 28 has a generally triradiate cross section substantially symmetric about the center axis of the bearing holder 26 and, thus, includes a central portion about the center axis of the bearing holder 26 and three generally semicylindrical groove portions merging radially outwardly from the central portion of the cavity 28. The semicylindrical groove portions of the cavity 28 are arranged substantially in symmetry about the center axis of the bearing holder 26 and have diameters which are substantially equal to one another. The diameters of the semicylindrical groove portions are further such that the outer race members 22 and 22' of each of the bearing units 12a, 12b and 12c can be closely received in each of the groove portions due to the elasticity of the bearing holder 26 as will be described more clearly as the description proceeds. The semicircular peripheral length of each of the groove portions is preferably slightly larger than one half of the full circumferential length of a geometrical cylinder having a diameter equal to the diameter of each groove portion or, in other words, each of the semicylindrical groove portions has about its center axis a central angle slightly larger than 180 degrees.

The bearing holder 26 thus configured is constructed of an elastic material preferably having a relatively high resistance to oil and a relatively high impact strength. Examples of such a material are acetal resins commercially available under the registered trademarks of "Dulacon" and "Delrin".

The bearing units 12a, 12b and 12c each constructed as described hereinbefore are assembled to the bearing holder 26 in such a manner that the individual bearing units 12a, 12b and 12c fit in the semicylindrical groove portions, respectively, of the cavity 28. The individual bearing units 12a, 12b and 12c mounted on the bearing holder 26 in this fashion are arranged substantially in symmetry about the center axis of the bearing holder 26 and project substantially semicylindrically into the central portion of the cavity 28 in the bearing holder 26. The rotatable member 14 of each of the bearing units 12a, 12b and 12c is, thus, freely rotatable about the center axis thereof partly through the central portion of the cavity 28. The bearing holder 26 has in its inner peripheral wall a circumferential groove 30 (FIG. 3) around the respective rotatable members 18 of the individual bearing units 12a, 12b and 12c. Thus, the rotatable member 18 of each of the bearing units 12a, 12b and 12c is enabled to freely rotate about the aligned center axes of the shafts 16 and 16' of each bearing unit without being interferred by the bearing holder 26.

The subassembly of the bearing units 12a, 12b and 12c and the bearing holder 26 thus constituting each of the upper and lower journal bearing assemblies 10a and 10b is mounted in a casing 32 consisting of a hollow, cylindrical portion 34 and two lug portions 36 and 36' projecting outwardly from the cylindrical portion 44, as shown in FIG. 2. The cylindrical portion 34 of the casing 32 has an inside diameter which is such that the bearing holder 26 is closely received on or elastically pressed against the inner peripheral surface of the cylindrical portion 34 of the casing 32 when the bearing units 12a, 12b and 12c incorporated therein as above described is fitted into the cylindrical portion 34 as shown. The cylindrical portion 34 of the casing 32 is formed with an axial gap 38 (FIG. 2) longitudinally extending between the opposite axial ends of the cylindrical portion 34 substantially in parallel with the center axis of the bore in the cylindrical portion 34. The cylindrical portion 34 of the casing 32 which is constructed of, for example, a casting of metal, is slightly contractable about the center axis of the cylindrical portion 34 having the gap 38 thus formed therein. On the other hand, the lug portions 36 and 36' of the casing 32 are formed on the cylindrical portion 34 of the casing 32 and are spaced apart from each other so as to form therebetween a gap which is contiguous to the axial gap 38 formed in the cylindrical portion 34 of the casing 32. Furthermore, the lug portions 36 and 36' of the casing 32 are formed with bores 40 and 40', respectively, which are substantially aligned with each other across the gap thus formed between the lug portions 36 and 36', as indicated by dotted lines in FIG. 2. A clamping bolt 42 is fitted to the lug portions 36 and 36' through these bores 40 and 40' and is tightened to the lug portions 36 and 36' by means of a nut 44 fastened to the clamping bolt 42. The clamping bolt 42 and the nut 44 constitute, in combination, adjustable clamp means engaging the lug portions 36 and 36' for adjustably clamping the lug portions together and thereby adjustably tightening the cylindrical portion 34 of the casing 32 onto the bearing 26, as will be discussed in more detail.

Before the clamping bolt 42 is thus tightened to the lug portions 36 and 36' of the casing 32 by means of the nut 44, the spindle S to be radially supported by the upper and lower bearing assemblies 10a and 10b is fitted to the subassembly of the bearing holder 26 and the bearing units 12a, 12b and 12c incorporated in the bearing holder. The spindle S or each of the journal portions of the spindle S is passed through an open space formed between the three bearing units 12a, 12b and 12c in the bearing holder 26 of each journal bearing assembly and is in rollable contact with the respective rotatable members 14 of the individual bearing units 12a, 12b and 12c. Furthermore, the bearing holder 26 has on its outer peripheral surface a projection (not shown) axially extending throughout the length of the bearing holder 26 and is mounted in the cylindrical portion 34 of the casing 32 in such a manner that the axial projection of the bearing holder 26 loosely fits into the axial gap 38 in the cylindrical portion 34 so that the bearing holder 26 is correctly positioned with respect to the cylindrical portion 34 of the casing 32. After the subassembly of the bearing holder 26 and the bearing units 12a, 12b and 12c of each journal bearing assembly is thus fitted to the spindle S and the cylindrical portion 34 of the casing 32, the nut 44 is fastened to and turned on the clamping bolt 42 so as to move the lug portions 36 and 36' of the casing 32 toward each other and accordingly cause the cylindrical portion 34 of the casing 32 to elastically contract about the center axis of the cylindrical portion 34. The bolt 42 and nut 43 are tightened to the lug portions 36 and 36' of the casing 32 until the cylindrical portion 34 of the casing 32 thus contracted is sufficiently tightened to the bearing holder 26 against the elastic resistance of the bearing holder 26. As a consequence, the individual bearing units 12a, 12b and 12c are closely and securely captured in the semicylindrical groove portions, respectively, of the cavity 28 in the bearing holder 26. With the cylindrical portion 34 of the casing 32 thus clamped to the bearing holder 26, the center axis of the spindle S held in position by the three bearing units 12a, 12b and 12c is substantially coincident with the center axis of the bearing holder 26 and the center axis of the cylindrical portion 34 of the casing 32 and, furthermore, the respective rotatable members 18 of the bearing units 12a, 12b and 12c are uniformly and closely held in rollable contact with the spindle S or each of the journal portions of the spindle S. For the reason which will be understood as the description proceeds, it is preferable that each of the bearing units 12a, 12b and 12c be dimensioned so that the diameter of the rotatable member 18 forming part of each of the bearing units is larger than the diameter of the spindle S or each of the journal portions of the spindle S.

The upper and lower bearing assemblies 10a and 10b each constructed and arranged as hereinbefore described engage the previously mentioned two journal portions, respectively, of the spindle S and are respectively supported by stationary brackets 46 and 46' which are secured to or integral with the respective casings 32 of the bearing assemblies 10a and 10b. In each of the bearing assemblies 10a and 10b, the outer race members 22 and 22' of the respective ball bearings 18 and 18' of the three bearing units 12a, 12b and 12c are properly retained in vertical positions in the cylindrical portion 34 of the casing 32 by upper and lower annular members 48 and 48' which are secured to the cylindrical portion 34 of the casing 32 along the upper and lower circumferential ends of the cylindrical portion 34. The spindle S projects upwardly through the central opening in the upper annular member 48 of the upper bearing assembly 10a and has securely mounted thereon a bobbin support disc 50 having a suitable number of pins 52 projecting upwardly from the disc 50. A bobbin (not shown) is detachably mounted on the bobbin support disc 50 through the pins 52 which are inserted into the elongated holes (not shown) which are formed in the bobbin. The bobbin support disc 50 has on its lower side an annular flange or projection slidably received in an annular groove formed in the upper annular member 48 attached to the bearing assembly 10a for providing a dustproof seal between the annular member 48 and the spindle S. The spindle S has further securely mounted thereon a flanged hub 54 which is located adjacent the upper annular member 48 of the lower bearing assembly 10b and which projects into the central opening in the annular member 48. The hub 54 is formed with an annular flange or projection slidably received in an annular groove formed in the upper annular member 48 of the bearing assembly 10a for thereby providing a dustproof seal between the annular member 48 and the spindle S.

In the embodiment of the bearing mechanism hereinbefore described with reference to the drawings, the upper and lower annular members 48 and 48' and the cylindrical portion 34 of the casing 32 of each of the upper and lower journal bearing assemblies 10a and 10b are assumed to constitute, in combination, a housing structure having the bearing units 12a, 12b and 12c housed therein. The upper and lower annular members 48 and 48' forming part of such a housing structure are herein assumed and shown as being constructed independently of the cylindrical portion 34 of the casing 32 in each of the journal bearing assemblies 12a and 12b. It will however be apparent that, if desired, one or both of these annular members 48 and 48' may be integral with the cylindrical portion 34 of the casing 32 of each journal bearing assembly.

Figure 4:
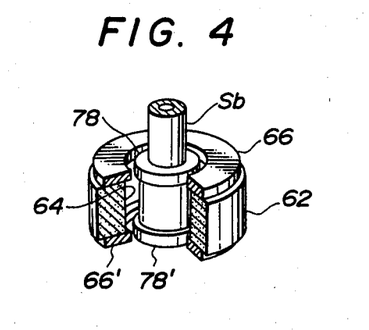
FIG. 4 is a partially cut-away fragmentary view which shows, also to an enlarged scale, part of the non-contact, magnetic thrust bearing unit forming part of the embodiment of the bearing mechanism according to the present invention.

In accordance with the present invention, the bearing mechanism comprising the two journal bearing assemblies 10a and 10b thus constructed and arranged further comprises a non-contact, magnetic thrust bearing unit which is generally designated by reference numeral 56 in FIGS. 1, 3 and 4 of the drawings.

In FIGS. 1, 3 and 4 of the drawings, the magnetic thrust bearing unit 56 is shown provided in combination with the lower journal bearing assembly 10b by way of example and is adapted to carry the axial load of the spindle S adjacent the lower end of the spindle S. For this purpose, the lower annular member 48' of the lower journal bearing assembly 10b is formed with an axial bore 58 which is open upwardly into the interior space in the above mentioned housing structure of the journal bearing assembly 10b, and a cylindrical socket 60 which is open downwardly from the lower or outer axial end of the bore 58 and which is larger in cross section or diameter than the bore 58 as will be seen from FIGS. 1 and 3. The axial bore 58 and the socket 60 thus formed in the lower annular member 48' have respective center axes substantally coincident with the center axis of the previously mentioned lower axial extension Sb of the spindle S.

The above mentioned non-contact, magnetic thrust bearing unit 56 provided in the embodiment of the present invention is disposed in conjunction with the lower axial extension Sb of the spindle S and, as will be better seen from FIG. 4, comprises a cylindrical or ring-shaped permanent magnet member 62 having a center axis therethrough and formed with a cylindrical axial bore 64 having a center axis substantially coincident with the center axis of the magnet member 62. The magnet member 62 has an outside diameter smaller than the diameter of the above mentioned cylindrical socket 60 in the lower annular member 48' of the journal bearing assembly 10b and an inside diameter preferably equal to the diameter of the axial bore 58 in the annular member 48' of the journal bearing assembly 10b. The magnet member 61 is magnetized to have opposite magnetic poles at its opposite axial ends.

The magnetic thrust bearing unit 56 further comprises a pair of ring-shaped or annular pole pieces 66 and 66' which are securely attached in substantially coaxial relationship to the opposite, upper and lower end faces, respectively, of the magnet member 62 by the attractive forces of the magnet member 62 or by means of a metal-to-metal adhesive compound. Each of the upper and lower pole pieces 66 and 66' has inside and outside diameters which are preferably smaller than the inside and outside diameter, respectively, of the magnet member 62. When the pole pieces 66 and 66' are substantially coaxially attached to the opposite end faces of the magnet member 62, the outer perimeter of each of the pole pieces is thus encompassed by or radially inboard of the outer circumferential edge of each end face of the magnet member 62. On the other hand, the inner perimeter of each of the pole pieces 66 and 66' is radially outboard of and accordingly in coaxially encircling relationship to the inner circumferential edge of each end face of the magnet member 62.

The subassembly of the permanent magnet member 62 having the pole pieces 66 and 66' thus attached thereto is mounted in a receptacle member 68 which is preferably constructed of a non-magnetic material such as a rigid synthetic resin. The receptacle member 68 has a hollow cylindrical portion 70 and inner and outer flange portions 72 and 74 radially projecting inwardly and outwardly from one axial end of the cylindrical portion 70 as will be best seen in FIG. 3 of the drawings. The cylindrical portion 70 of the receptacle member 68 thus configured has an outside diameter substantially equal to the diameter of the cylindrical socket 60 in the lower annular member 48' of the journal bearing assembly 10b and an inside diameter substantially equal to the outside diameter of the magnet member 62. On the other hand, the inner annular flange portion 72 of the receptacle member 68 has an inside diameter which is preferably equal to the diameter of the axial bore 58 in the annular member 48' and accordingly also to the inside diameter of the magnet member 62. The size of the outer flange portion 74 of the receptacle member 68 may be selected suitably in consideration of the geometry of the annular member 48'.

The permanent magnet member 62 with the pole pieces 66 and 66' attached thereto is mounted in the receptacle member 68 in such a manner that the magnet member 62 has its outer peripheral surface closely received on the inner peripheral surface of the hollow cylindrical portion 70 of the receptacle member 68. Furthermore, the subassembly of the magnet member 62 and the pole pieces 66 and 66' is axially held in the cylindrical portion 70 of the receptacle member 68 by means of a ring-shaped or annular retainer element 76 which has an inside diameter preferably equal to the diameter of the axial bore 58 in the annular member 48' and an outside diameter substantially equal to the inside diameter of the hollow cylindrical portion 70 of the receptacle member 68. The retainer element 76 thus sized is securely fitted in the axial bore in the cylindrical portion 70 adjacent the projecting axial end of the cylindrical portion 70 and is preferably bonded to the inner peripheral surface of the cylindrical portion 70. The upper pole piece 66 has its upper or outer end face closely received on the lower or inner face of the retainer element 76 and the lower pole piece 66' has its lower or outer end face closely received on the upper or inner end face of the inner annular flange portion 72 of the receptacle member 68 with the result that the subassembly of the magnet member 66 and the pole pieces 66 and 66' is securely held in axial position between the retainer element 76 and the inner annular flange portion 72 of the receptacle member 68.

The receptacle member 68 having the magnet member 62 and the pole pieces 66 and 66' thus mounted in the hollow cylindrical portion 70 thereof is fixed to the annular member 48' of the lower journal bearing assembly 10b with the cylindrical portion 70 closely fitted into the socket 60 in the annular member 48' and with the outer flange portion 74 secured to the lower end face of the annular member 48' as shown in FIGS. 1 and 3. The receptacle member 68 may be bonded or otherwise connected by suitable mechanical fastening means (not shown) to the annular member 48' or may be position adjustably fitted to the annular member 48' through threaded engagement between the annular member 48' and the cylindrical portion 70 of the receptacle member 68.

On the other hand, the lower axial extension Sb of the spindle S extends axially through the axial bore 58 in the annular member 48' of the lower journal bearing assembly 10b and the axial bore in the cylindrical or ring-shaped permanent magnet member 62 and has a lower end portion slightly projecting into the opening in the inner annular flange portion 72 of the receptacle member 68, as will be best seen in FIG. 3.

The lower end portion of the lower axial extension Sb of the spindle S is, thus, coaxially encircled in part by the upper pole piece 66 and in part by the lower pole piece 66'. Preferably, the spindle S has on the lower end portion of its lower axial extension Sb two circumferential projections or flanges 78 and 78' which are coaxially encircled by and radially inwardly spaced apart uniformly from the inner peripheral surfaces of the upper and lower pole pieces 66 and 66', respectively, attached to the magnet member 62 as shown in FIGS. 1 and 3. If, in this instance, the spindle S including the lower axial extension Sb is constructed in its entirety by a ferromagnetic material such as steel or a steel alloy, these circumferential projections or flanges 78 and 78' may form part of the lower axial extension Sb of the spindle S or may be constructed of a suitable ferromagnetic material such as steel or a steel alloy. If, on the other hand, the spindle S as a whole or at least the lower axial extension Sb of the spindle S is constructed of a non-ferromagnetic material, then the circumferential projections or flanges 78 and 78' of the extension Sb of the spindle S should be constructed of a suitable ferromagnetic material such as steel or a steel alloy independently of the spindle S or at least the extension Sb of the spindle S and securely connected to the extension Sb of the spindle S.

The non-contact, magnetic thrust bearing unit 56 being thus constructed and arranged in conjunction with the lower axial extension Sb of the spindle S, the extension Sb of the spindle S, viz., the spindle S as a whole is held in axial position with respect to the respective housing structure of the upper and lower journal bearing assemblies 10a and 10b on the stationary brackets 46 and 46′ by virtue of the magnetic interaction between the upper pole piece 66 and the associated circumferential projection or flange 78 of the spindle S and between the lower pole piece 66′ and the associated circumferential projection or flange 78′ of the spindle S, as will be readily understood.

When, now, the bearing mechanism thus constructed and arranged is put use in a textile machine such as for example a yarn wrapping or covering machine as previously noted, the spindle S is driven for rotation about the center axis thereof by suitable drive mean which may include, by way of example, an endless belt (not shown). The endless belt is horizontally stretched between two rollers (not shown) and is in partially wrapping contact with an intermediate axial portion of the spindle S. Though not shown in the drawings, the two rollers engaging the endless belt are horizontally spaced apart from each other and are arranged so that one of the rollers is to be driven for rotation by a suitable power-operated drive unit each as an electric motor and the other of the rollers acts as an idler. By the endless belt thus driven to move in contact with the spindle, the spindle S is driven to rotate about the center axis thereof on the rotatable members 14 of the respective bearing units 12a, 12b and 12c of the two journal bearing assemblies 10a and 10b and causes each of the rotatable members 14 to rotate about the center axis of each bearing unit in a direction opposite to the direction of rotation of the spindle S. The rotation of the rotatable member 14 of each bearing unit is carried through the shafts 16 and 16′ to the respective inner race members 20 and 20′ of ball bearings 18 and 18′ of the bearing unit and is smoothed by the spherical rolling elements 24 and 24′ which roll between the respective inner and outer race members 20 and 22 and inner and outer race members 22′ and 24′ of the bearings 18 and 18′.

The bearing units 12a, 12b and 12c of each of the bearing assemblies 10a and 10b being uniformly forced in radial directions of the bearing holder 26 toward the center axis of the cylindrical portion 34 of the casing 32 and accordingly toward the center axis of the spindle S by means of the elastic bearing holder 26, the pressing forces transferred to the spindle S from the respective rotatable members 14 of the individual bearing units 12a, 12b and 12c are effectively cancelled by one another. The spindle S is, thus, substantially free from any localized load in radial directions of the spindle and is capable of driving the respective rotatable members 14 of the individual bearing units 12a, 12b and 12c by substantially equal forces. The force which may be exerted on the spindle S by the endless belt forced against the intermediate axial portion of the spindle is taken up by the engagement between the previously mentioned projection of the bearing holder 26 and the cylindrical portion 34 of the casing 32 through the axial gap 38 (FIG. 2) formed in the cylindrical portion 34.

While the spindle S is thus being driven for rotation about its center axis with respect to the stationary brackets 46 and 46′, the radial load imparted to the spindle S is carried and taken up by the upper and lower journal bearing assemblies 10a and 10b supported by the brackets 46 and 46′, respectively, and the axial load imparted to the spindle S is carried and taken up by the magnetic thrust bearing unit 56 supported by the housing structure of the lower journal bearing assembly 10b. Since, in this instance, the magnetic thrust bearing unit 56 per se is mechanically isolated from the spindle S, both the spindle S and the thrust bearing unit 56 are subjected to no wear and abrasion therebetween so that not only the thrust bearing unit 56 will provide a satisfactorily prolonged service life but the spindle S is enabled to withstand the rotation at the speeds allowed by the journal bearing assemblies 10a and 10b. The magnetic thrust bearing unit 56 is, thus, useful for enhancing and guaranteeing the intrinsic capabilities of the journal bearing assemblies 10a and 10b.

In the magnetic thrust bearing unit 56 which is thus operative, the pole pieces 66 and 66′ are effective to localize and concentrate the magnetic flux around the circumferential projections or flanges respectively, of the lower axial extension Sb of the spindle S and may therefore be dispensed with if desired.

Since, moreover, the pole pieces 66 and 66′ attached to the magnet member 62 are radially inwardly displaced from the opposite end faces of the magnet member 62, the magnetic forces imparted to the circumferential projections or flanges 78 and 78′ of the spindle S are localized and concentrated more effectively and are capable of reliably bearing the axial load of the spindle S. It will however be apparent that, if desired, the pole pieces 66 and 66′ can be shaped and sized conformingly to the cross section of the magnet member 62 so that the pole pieces 66 and 66′ are substantially coextensive or in registry with the annular end faces of the magnet member 62.

While the embodiment of the present invention as hereinbefore described uses a permanent magnet as the magnet member 62 of the magnetic thrust bearing unit 56, an electric magnet composed of an iron core and a current-carrying coil may be used in lieu of the permanent magnet member 62, though not shown in the drawings annexed hereto.

While, furthermore, it has been described that the circumferential projections or flanges 78 and 78′ are formed of a ferromagnetic material, each of the projections or flanges 78 and 78′ may be constructed of a permanent magnet constructed independently of and securely fixed to the lower axial extension Sb of the spindle S. In this instance, the permanent magnet member 62 may be replaced with a ring-shaped or cylindrical block of a suitable ferromagnetic material such as steel or a steel alloy.

It has been described that the non-contact, magnetic thrust bearing unit forming part of the bearing mechanism according to the present invention is used in combination with two journal bearing assemblies each of the nature hereinbefore described and shown. This is, however, merely for the purpose of illustration and, for this reason, the non-contact, magnetic thrust bearing unit included in the bearing mechanism may be used in combination with only one of such journal bearing assemblies or with at least one journal bearing assembly of another nature. For example, each of the journal bearing assemblies 10a and 10b in the embodiment of the bearing mechanism which has been herein described with reference to the drawings may be substituted by a journal bearing assembly which is constructed basically similarly to the bearing assemblies 10a and 10b but which uses four or more bearing units each constructed and arranged similarly to the bearing units 12a, 12b and 12c of each of the bearing assemblies 10a and 10b.

Furthermore, the non-magnetic, magnetic thrust bearing unit 56 in the embodiment herein described and shown has been assumed to be provided in association with the lower axial extension Sb of the spindle S but, if desired, such a thrust bearing unit may be arranged in association with the upper axial extension of the spindle S. It will further be apparent that, although the embodiment of the present invention has been described and shown as using only one thrust bearing unit, the bearing mechanism according to the present invention may comprise two of such a thrust unit in association with opposite axial end portions of the spindle to be supported by the bearing mechanism.

What is claimed is:

1. A bearing mechanism for supporting an elongated rotary member having a center axis therethrough and rotatable about the center, the rotary member having at least one journal portion and at least one axial end portion, comprising a stationary support structure, at least one journal bearing assembly supported on said stationary support structure and engaging said journal portion for being operative to carry radial load from said rotary member, and a non-contact, magnetic thrust bearing unit which is stationary with respect to said support structure and which is positioned adjacent said axial end portion of said rotary member, said thrust bearing unit comprising a cylindrical member having an axial bore therein and positioned in substantially coaxially encircling relationship to said axial end portion of the rotary member, only one of said cylindrical member and said end portion of said rotary member being constructed of a magnet.

2. A bearing mechanism as set forth in claim 1, in which said cylindrical member is constituted by a permanent magnet member having opposite poles at the opposite axial ends thereof.

3. A bearing mechanism as set forth in claim 2, in which said thrust bearing unit further comprises two annular pole pieces which are respectively attached to the opposite axial end faces of said magnet member and which are positioned in substantially coaxially encircling relationship to said axial end portion of said rotary member.

4. A bearing mechanism as set forth in claim 3, in which each of said pole pieces has inside and outside diameters which are smaller than the inside and outside diameters, respectively, of said magnet member.

5. A bearing mechanism as set forth in claim 3, in which said axial end portion of said rotary member has two circumferential projections which are axially spaced apart from each other and which are substantially coaxially encompassed by and radially inwardly spaced apart from the inner peripheral surfaces of said pole pieces, respectively.

6. A bearing mechanism as set forth in claim 3, in which each of said pole pieces has inside and outside diameters smaller than the inside and outside diameters, respectively, of said magnet member and in which said axial end portion of said rotary member has two circumferential projections which are axially spaced apart from each other and which are substantially coaxially encompassed by and radially inwardly spaced apart from the inner peripheral surfaces of said pole pieces, respectively.

7. A bearing mechanism as set forth in any one of claims 1 to 6, in which said journal bearing assembly comprises a hollow casing connected to said support structure, a bearing holder closely and detachably fitted in the casing and formed with a cavity having a center axis therethrough and including a central portion and at least three generally semicylindrical groove portions merging radially outwardly from the central portion, and bearing units positioned each in part in said semicylindrical groove portions, respectively, and substantially semicylindrically protruding each in part into the central portion of the cavity, each of the bearing units comprising a rotatable member having a circular cross section and rotatable in part through the central portion of the cavity and in part through each of said semicylindrical groove portions about an axis substantially parallel with the center axis of the cavity, and at least one bearing comprising an inner race member positioned on one side of said rotatable member and rotatable with the rotatable member, an outer race member radially spaced apart from the inner race member and closely and detachably fitted to said bearing holder, and a plurality of rolling elements rollably disposed between the inner and outer race members, the respective rotatable members of the individual bearing units being larger in diameter than the respective outer race members in the individual bearing units and forming therebetween an open space for passing said journal portion of said elongated rotary member therethrough so that the journal portion of the rotary member is in rollable contact with the peripheral surfaces of the respective rotatable members of the bearing units and is retained in a position having its center axis substantially in alignment with the center axis of said cavity.

8. A bearing mechanism as set forth in claim 7, in which said semicylindrical portions of the cavity in said bearing holder are arranged substantially in symmetry about the center axis of the cavity.

9. A bearing mechanism as set forth in claim 7, in which said bearing holder is further formed with an axial gap extending throughout the axial length of the bearing holder and located intermediate between neiboring two of said semicylindrical groove portions of the cavity in the bearing holder.

10. A bearing mechanism as set forth in claim 9, in which said axial gap is substantially parallel with the center axis of the cavity in said bearing holder.

11. A bearing mechanism as set forth in claim 7, in which said casing comprises a hollow, generally cylindrical portion having said bearing holder closely and detachably fitted on the inner peripheral surface of the cylindrical portion.

12. A bearing mechanism as set forth in claim 11, in which said casing further comprises two lug portions fast on said cylindrical portion and spaced apart from each other for forming therebetween gap contiguous to said axial gap in the cylindrical portion, said casing being provided with adjustable clamp means engaging said lug portions for adjustably clamping the lug portions together and thereby adjustably tightening said cylindrical portion of the casing onto the bearing holder fitted in the cylindrical portion.

13. A bearing mechanism as set forth in claim 12, in which the cylindrical portion of the casing is formed with an axial gap extending throughout the axial length of the cylindrical portion so that the cylindrical portion is elastically contractable and expansible about the center axis of the cylindrical portion.

14. A bearing mechanism as set forth in claim 7, in which said thrust bearing unit further comprises a receptacle member secured to said casing and having a hollow, cylindrical portion formed with an axial bore substantially coaxially surrounding said axial end portion of said elongted rotary member, said magnet member being closely received in said axial bore in the cylindrical portion of said receptacle member.

* * * * *